(12) United States Patent
Jutzi et al.

(10) Patent No.: US 7,328,455 B2
(45) Date of Patent: Feb. 5, 2008

(54) APPARATUS AND METHOD FOR ENABLING SECURE CONTENT DECRYPTION WITHIN A SET-TOP BOX

(75) Inventors: Curtis E. Jutzi, Lake Oswego, OR (US); Richard P. Mangold, Forest Grove, OR (US); Ajit P. Joshi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 879 days.

(21) Appl. No.: 09/895,057

(22) Filed: Jun. 28, 2001

(65) Prior Publication Data

US 2003/0005301 A1    Jan. 2, 2003

(51) Int. Cl.
G06F 7/04 (2006.01)
(52) U.S. Cl. .......................... 726/26; 713/176; 726/27; 380/201
(58) Field of Classification Search ................ 713/176, 713/150, 164; 705/57; 380/211, 201; 707/57; 726/26, 27, 29
See application file for complete search history.

(56) References Cited

U.S. PATENT DOCUMENTS

| 4,546,382 A | 10/1985 | McKenna et al. |
| 4,566,030 A | 1/1986 | Nickerson et al. |
| 4,602,279 A | 7/1986 | Freeman |
| 4,624,578 A | 11/1986 | Green |
| 5,075,771 A | 12/1991 | Hashimoto |
| 5,155,591 A | 10/1992 | Wachob |
| 5,227,874 A | 7/1993 | Von Kohorn |
| 5,388,211 A | 2/1995 | Hornbuckle |
| 5,392,223 A | 2/1995 | Caci |
| 5,410,344 A | 4/1995 | Graves et al. |
| 5,444,499 A | 8/1995 | Saitoh |
| 5,446,919 A | 8/1995 | Wilkins |
| 5,483,278 A | 1/1996 | Strubbe et al. |
| 5,530,082 A | 6/1996 | Friebe et al. |

(Continued)

FOREIGN PATENT DOCUMENTS

EP    0 064 168 A1    11/1982

(Continued)

OTHER PUBLICATIONS

"Client Infrastructure for Internet-Based Data Services for Digital Television: Enabling a New Class of DTV Services", *Intel Architecture Labs*, (2002),1-10.

(Continued)

*Primary Examiner*—Ellen Tran
(74) *Attorney, Agent, or Firm*—Molly A. McCall

(57) ABSTRACT

An apparatus and method for enabling secure content decryption within a set-top box are described. The method includes performance of security authentication of a content driver by a content decryption component. Security authentication is performed in order to verify an identity of the content driver as a secure content driver. Next, the content decryption component receives an encrypted content stream from the secure content driver. Once received, the content decryption component performs integrity authentication of a run-time image of the secure content driver. Finally, while integrity authentication of the secure content driver is verified, the content decryption component streams decrypted content to the secure content driver to enable playback of the decrypted content to a user.

27 Claims, 13 Drawing Sheets

U.S. PATENT DOCUMENTS

| | | |
|---|---|---|
| 5,534,911 A | 7/1996 | Levitan |
| 5,544,161 A | 8/1996 | Bigham et al. |
| 5,559,549 A | 9/1996 | Hendricks et al. |
| 5,564,088 A | 10/1996 | Saitoh |
| 5,585,838 A | 12/1996 | Lawler et al. |
| 5,600,364 A | 2/1997 | Hendricks et al. |
| 5,600,573 A | 2/1997 | Hendricks et al. |
| 5,664,091 A | 9/1997 | Keen |
| 5,686,954 A | 11/1997 | Yoshinobu et al. |
| 5,724,345 A | 3/1998 | Guarneri et al. |
| 5,727,002 A | 3/1998 | Miller et al. |
| 5,734,890 A | 3/1998 | Case et al. |
| 5,740,549 A | 4/1998 | Reilly et al. |
| 5,751,282 A | 5/1998 | Girard et al. |
| 5,758,257 A | 5/1998 | Herz et al. |
| 5,768,681 A | 6/1998 | Dan et al. |
| 5,778,182 A | 7/1998 | Cathey et al. |
| 5,790,935 A | 8/1998 | Payton |
| 5,801,747 A | 9/1998 | Bedard |
| 5,801,753 A | 9/1998 | Eyer et al. |
| 5,838,678 A | 11/1998 | Davis et al. |
| 5,848,396 A | 12/1998 | Gerace |
| 5,867,799 A | 2/1999 | Lang et al. |
| 5,920,700 A | 7/1999 | Gordon et al. |
| 5,930,493 A | 7/1999 | Ottesen et al. |
| 5,937,411 A | 8/1999 | Becker |
| 5,940,073 A | 8/1999 | Klosterman et al. |
| 5,940,738 A | 8/1999 | Rao |
| 5,945,988 A | 8/1999 | Williams et al. |
| 5,973,683 A | 10/1999 | Cragun et al. |
| 5,974,398 A | 10/1999 | Hanson et al. |
| 5,977,964 A | 11/1999 | Williams et al. |
| 5,991,735 A | 11/1999 | Gerace |
| 5,991,841 A | 11/1999 | Gafken et al. |
| 5,999,526 A | 12/1999 | Garland et al. |
| 5,999,908 A | 12/1999 | Abelow |
| 6,002,393 A | 12/1999 | Hite et al. |
| 6,002,852 A | 12/1999 | Birdwell et al. |
| 6,005,597 A | 12/1999 | Barrett et al. |
| 6,006,247 A | 12/1999 | Browning et al. |
| 6,012,051 A | 1/2000 | Sammon, Jr. et al. |
| 6,018,359 A | 1/2000 | Kermode et al. |
| 6,018,768 A | 1/2000 | Ullman et al. |
| 6,020,883 A | 2/2000 | Herz et al. |
| 6,021,433 A | 2/2000 | Payne et al. |
| 6,055,560 A | 4/2000 | Mills et al. |
| 6,088,722 A | 7/2000 | Herz et al. |
| 6,108,645 A | 8/2000 | Eichstaedt et al. |
| 6,114,376 A | 9/2000 | Prichard et al. |
| 6,118,492 A | 9/2000 | Milnes et al. |
| 6,119,189 A | 9/2000 | Gafken et al. |
| 6,125,259 A | 9/2000 | Perlman |
| 6,131,127 A | 10/2000 | Gafken et al. |
| 6,144,376 A | 11/2000 | Connelly |
| 6,148,005 A | 11/2000 | Paul et al. |
| 6,160,989 A | 12/2000 | Hendricks et al. |
| 6,184,918 B1 | 2/2001 | Goldschmidt Iki et al. |
| 6,226,618 B1 | 5/2001 | Downs et al. |
| 6,271,893 B1 | 8/2001 | Kawaguchi et al. |
| 6,279,040 B1 | 8/2001 | Ma et al. |
| 6,289,012 B1 | 9/2001 | Harrington et al. |
| 6,289,510 B1 | 9/2001 | Nakajima |
| 6,298,482 B1 | 10/2001 | Seidman et al. |
| 6,304,578 B1 | 10/2001 | Fluss |
| 6,317,881 B1 | 11/2001 | Shah-Nazaroff et al. |
| 6,349,321 B1 | 2/2002 | Katayama |
| 6,357,042 B2 | 3/2002 | Srinivasan et al. |
| 6,359,557 B2 | 3/2002 | Bilder |
| 6,359,571 B1 | 3/2002 | Endo et al. |
| 6,374,405 B1 | 4/2002 | Willard |
| 6,378,036 B2 | 4/2002 | Lerman et al. |
| 6,389,593 B1 | 5/2002 | Yamagishi |
| 6,397,387 B1 | 5/2002 | Rosin et al. |
| 6,424,625 B1 | 7/2002 | Larsson et al. |
| 6,434,747 B1 | 8/2002 | Khoo et al. |
| 6,449,632 B1 | 9/2002 | David et al. |
| 6,457,010 B1 | 9/2002 | Eldering et al. |
| 6,460,036 B1 | 10/2002 | Herz et al. |
| 6,463,585 B1 | 10/2002 | Hendricks et al. |
| 6,467,089 B1 | 10/2002 | Aust et al. |
| 6,477,704 B1 | 11/2002 | Cremia |
| 6,480,783 B1 | 11/2002 | Myr |
| 6,490,722 B1 | 12/2002 | Barton et al. |
| 6,513,014 B1 | 1/2003 | Walker et al. |
| 6,513,069 B1 | 1/2003 | Abato et al. |
| 6,526,455 B1 | 2/2003 | Kamimura |
| 6,529,526 B1 | 3/2003 | Schneidewend |
| 6,557,042 B1 | 4/2003 | He et al. |
| 6,570,843 B1 | 5/2003 | Wolfgang |
| 6,571,389 B1 | 5/2003 | Spyker et al. |
| 6,574,518 B1 | 6/2003 | Lounsberry et al. |
| 6,578,199 B1 | 6/2003 | Tsou et al. |
| 6,594,682 B2 | 7/2003 | Peterson et al. |
| 6,601,237 B1 | 7/2003 | Ten Kate et al. |
| 6,617,980 B2 | 9/2003 | Endo et al. |
| 6,625,716 B2 | 9/2003 | Fackenthal |
| 6,642,862 B2 | 11/2003 | Boudry |
| 6,642,939 B1 | 11/2003 | Vallone et al. |
| 6,668,246 B1 * | 12/2003 | Yeung et al. ............ 705/57 |
| 6,678,890 B1 | 1/2004 | Cai |
| 6,718,551 B1 | 4/2004 | Swix et al. |
| 6,782,476 B1 * | 8/2004 | Ishibashi ............ 713/169 |
| 6,801,936 B1 | 10/2004 | Diwan |
| 6,923,911 B1 | 8/2005 | Beier et al. |
| 7,017,189 B1 * | 3/2006 | DeMello et al. ............ 726/26 |
| 7,020,893 B2 | 3/2006 | Connelly |
| 7,024,681 B1 | 4/2006 | Fransman et al. |
| 7,028,071 B1 | 4/2006 | Slik |
| 7,047,456 B2 | 5/2006 | Jutzi |
| 7,055,165 B2 | 5/2006 | Connelly |
| 7,093,295 B1 * | 8/2006 | Saito ............ 726/26 |
| 2001/0012299 A1 | 8/2001 | Dahlen |
| 2001/0013127 A1 | 8/2001 | Tomita et al. |
| 2001/0037507 A1 | 11/2001 | Mori |
| 2001/0047516 A1 | 11/2001 | Swain et al. |
| 2002/0073245 A1 | 6/2002 | Hallford |
| 2002/0143591 A1 | 10/2002 | Connelly |
| 2002/0143607 A1 | 10/2002 | Connelly |
| 2002/0144265 A1 | 10/2002 | Connelly |
| 2002/0144269 A1 | 10/2002 | Connelly |
| 2002/0145052 A1 | 10/2002 | Cessac |
| 2002/0152474 A1 | 10/2002 | Dudkiewicz |
| 2002/0162120 A1 | 10/2002 | Mitchell |
| 2002/0167947 A1 | 11/2002 | Hallford et al. |
| 2002/0193066 A1 | 12/2002 | Connelly |
| 2002/0194585 A1 | 12/2002 | Connelly |
| 2002/0194603 A1 | 12/2002 | Connelly |
| 2003/0005311 A1 | 1/2003 | Kajimura et al. |
| 2003/0005451 A1 | 1/2003 | Connelly |
| 2003/0005465 A1 | 1/2003 | Connelly |
| 2003/0005483 A1 | 1/2003 | Crinon et al. |
| 2003/0016673 A1 | 1/2003 | Pendakur et al. |
| 2003/0046633 A1 | 3/2003 | Jutzi |
| 2003/0046683 A1 | 3/2003 | Jutzi |
| 2003/0058933 A1 | 3/2003 | Jutzi |
| 2003/0061611 A1 | 3/2003 | Pendakur |
| 2003/0065520 A1 | 4/2003 | Jutzi et al. |
| 2003/0066090 A1 | 4/2003 | Traw et al. |
| 2003/0135553 A1 | 7/2003 | Pendakur |
| 2003/0135857 A1 | 7/2003 | Pendakur et al. |
| 2005/0273832 A1 | 12/2005 | Zigmond et al. |

FOREIGN PATENT DOCUMENTS

| | | |
|---|---|---|
| EP | 0902569 A1 | 3/1999 |
| EP | 1028551 | 8/2000 |
| EP | 1 043 892 A1 | 10/2000 |
| EP | 1 089 571 A2 | 4/2001 |
| EP | 1089201 | 4/2001 |
| EP | 1089572 | 4/2001 |
| JP | 2003 032710 | 1/2003 |
| WO | WO-97/26729 | 7/1997 |
| WO | WO-99/44159 | 9/1999 |
| WO | WO-99/65237 | 12/1999 |
| WO | WO-00/01149 | 1/2000 |
| WO | WO 00/40028 | 7/2000 |
| WO | WO 00/59204 | 10/2000 |
| WO | WO-00/64165 | 10/2000 |
| WO | WO-01/15449 | 3/2001 |
| WO | WO-01/15451 | 3/2001 |
| WO | WO-01/17195 | 3/2001 |
| WO | WO-01/72042 | 9/2001 |
| WO | WO-01/93524 | 12/2001 |
| WO | WO-02/48863 | 6/2002 |
| WO | WO-02/103940 | 12/2002 |
| WO | WO-02/103941 | 12/2002 |
| WO | WO-02/104030 | 12/2002 |
| WO | WO-02/104031 | 12/2002 |
| WO | WO-03/028381 | 4/2003 |
| WO | WO-03/030540 | 4/2003 |
| WO | WO-03/061245 | 7/2003 |

OTHER PUBLICATIONS

"Competitive Differences. ReplayTV Rules. Here's why . . . ", *Webpages*. <URL:http://www.replaytv.com/overview/differences.htm, ReplayTV,(Mar. 21, 2000),1-2.

"Digital Video Broadcasting (DVB); Specification for Service Information (SI) in DVB Ssytems", *ETSI EN 300 468 V1.4.1*, European Standard (Telecommunications series),(Nov. 2000), 1-85.

"Enhanced Digital Broadcast", *Webpages*. <URL:http//www.developer.intel.com/ial/home/digentertain/edg.htm, IAL Digital Entertain Initiative,(Aug. 21, 2001),1-3.

"Features", *Webpage*<URL http://www.replaytv.com/overview/features.htm, ReplayTV,(Mar. 21, 2000),1-2.

"Features Benefits", *Webpages*. <URL http://www.replaytv.com/overview/details.htm, ReplayTV,(Mar. 21, 2000),1-3.

"Frequently Asked QUESTIONS", *Webpages*. <URL http://www.tivo.com//what/fag_sub.html, TiVo.com,(Mar. 21, 2000),1-9.

"Frequently Asked Questions. Will ReplayTV make more popular? And other frequently asked questions.", *Webpages*. <URL http://www.replaytv.com/overview/fags,htm, ReplayTV,(Mar. 21, 2000),1-4.

"Internet and Broadcast: The Key to Digital Convergence. Utilizing Digital Technology to Meet Audience Demand", *Intel Architecture Labs Digital Entertainment Initiative*, (2000),1-4.

"PCT International Search Report", Appl. No. PCT/US01/43862, Mailed Dec. 4, 2003,1-4.

"PCT International Search Report", Appl. No. PCT/US02/17270, Mailed Jun. 3, 2003,1-4.

"PCT International Search Report", Appl. No. PCT/US02/17381, Mailed Oct. 20, 2003,1-6.

"PCT International Search Report", Appl. No. PCT/US02/17316, Mailed Nov. 6, 2002,1-8.

"PCT International Search Report", Appl. No. PCT/US02/29099, Mailed Mar. 28, 2003,1-7.

"PCT International Search Report", Appl. No. PCT/US03/00169, Mailed Jun. 2, 2003,1-7.

"Program and System Information Protocol for Terrestrial Broadcast and Cable (Revision A) and Amendment No. 1", *Advanced Television Systems Committee*, Originally Published Dec. 27, 1997,(May 31, 2000),I-III, 1-135.

"Technical Specifications", *Webpage*. <URL http://www.replaytiv.com/overview/techspecs.htm, ReplayTV,(Mar. 21, 2000),1.

"What is ReplayTV? Introducing the new ReplayTV 2020", *Webpage*. <URL: http://www.replaytv.com/overview/index.htm, ReplayTV,(Mar. 21, 2000),1.

"What is TiVo? Introduction to TiVo. A Better Way to WATCH TV", *Webpage*. <URL http://www.tivo.com/what/intro.html, TiVo.com-,(Mar. 21, 2000),1.

"What is TiVo? How TiVo Works. PRODUCT Specifications", *Webpage*. <URL http://www.tivo.com/what/how2.html, TiVo.com, (Mar. 21, 2000),1.

"What is TiVo? How TiVo Works. What You Want, When You Want It", *Webpage*. <URL http://www.tivo.com/what/how.html, TiVo.com,(Mar. 21, 2000),1.

"What is TiVo? Introduction TiVo. Channel SURF in a Whole New Way", *Webpage*, <URL http://www.tivo.com/what/intro4.html, TiVo.com,(Mar. 21, 2000),1.

"What is TiVo? Introduction to TiVo. Control LIVE TV", *Webpage*. <URL http://www.tivo.com/what/intro2.html, TiVo.com, (Mar. 21, 2000),1.

"What is TiVo? Introduction to TiVo. Something GOOD is Always On", *Webpage*. <URL http://www.tivo.com/what/intro3.html, TiVo.com,(Mar. 21, 2000),1.

"What isTiVo? Introduction to TiVo. DIGITAL Recordings without the Tape", *Webpage*. <URL http://www.tivo.com/what/intro5.html, TiVo.com,(Mar. 21, 2000),1.

"White Paper, Internet Protocol (IP) Multicast Technology Overview", *Webpages*. <URL: http//www.cisco.com/warp/public/cc/pd/iosw/tech/ipmu_ov.htm, Cisco Systems, Inc.,(Jun. 29, 2001),1-16.

Gummalla, Ajay Chandra V., "An Access Protocol for a Wireless Home Network", *IEEE*, Wireless Communications and Networking Conference, Sep. 21, 1999,(1999),1392-1396.

Hartwig, Stephan, et al., "Broadcasting and Processing of Program Guides for Digital TV", *SMPTE Journal, SMPTE, Inc.*, vol. 106, No. 10, Scarsdale, NY, XP000668926,(Oct. 1997),727-732.

Haskell, Barry G., et al., "Digital Video: An Introduct to MPEG-2", *Digital Multimedia Standards Series*, Chapman & Hall, (1977),cover, 280-283.

Haubner, DR. P. , et al., "Netzdienste fur Multimediale Anwendungen CSCW—MBone", *Teleseminar: Multimedia Systeme—Technologie and Gestaltung WS 95/96*, XP002248684,(1996),1-20.

Holfeder, Wienland , "Interactive Remote Recording and Playback of Multicast Videoconferences", XP002088645,(Sep. 10, 1997),450-463.

Hu, Qinglong , et al., "Power Conservative Multi-Attribute Queries on Data Broadcast", *IEEE*, Data Engineering, 16th International Confererence, San Diego, Calif.,(2000),157-177.

Hwang, Ren-Hung , et al., "Scheduling Policies for an VOD System over CATV Networks", *IEEE*, Department of Computer Science & Information Engineering,(1997),438-442.

Smyth, Barry , et al., "A Personalized TELEVISION Listings Service", *Communications of the ACM*, vol. 43, No. 8,(Aug. 2000),107-111.

Wittig, Hartmut , et al., "Intelligent Media Agents in Interactive Television Systems", *IEEE*, Proceedings of the Int'l Conf. on Multimedia Computing and Systems, Los Angeles, CA XP000603484,(May 15, 1995),182-189.

Information Technology—Generic Coding of Moving Pictures and Associated Audio: Systems, Recommendation H.222.0, ISO/IEC 13818-1, Nov. 13, 1994.

PCT Int'l Search Report, Int'l App. No. PCT/IS 02/29091, mailed Apr. 3, 2003.

U.S. Appl. No. 09/532,034, filed Mar. 22, 2000, Connelly.

U.S. Appl. No. 09/533,024, filed Mar. 22, 2000, Connelly.

U.S. Appl. No. 09/533,048, filed Mar. 22, 2000, Connelly.

U.S. Appl. No. 09/717,579, filed Nov. 21, 2000, Jutzi.

Business Wire, "MessageMedia Launches SupportView" (1999).

U.S. Office Action, U.S. Appl. No. 09/823,566, (Oct. 23, 2006), 1-8.

U.S. Office action, U.S. Appl. No. 10/044,544, (Oct. 18, 2006), 1-26.

U.S. Office Action, U.S. Appl. No. 10/044,546, (Nov. 15, 2006), 1-23.

* cited by examiner

APPARATUS AND METHOD FOR ENABLING SECURE CONTENT DECRYPTION WITHIN A SET-TOP BOX

FIELD OF THE INVENTION

The invention relates generally to the field of set-top boxes. More particularly, the invention relates to a method and apparatus for enabling secure content decryption within a set-top box.

BACKGROUND OF THE INVENTION

Broadcast systems traditionally transmit content from a broadcast server system to a plurality of client systems. Users of the client systems consume the content received from the broadcast server system as broadcast using, for example, a set-top box. For instance, cable television providers commonly broadcast the same movies repeatedly on multiple channels at staggered intervals. As such, users of the client systems, or set-top boxes, typically consume the content signals received from the server as they are broadcast. However, such broadcasts generally have the capability to generate additional revenues by broadcasting content, which is offered to users at a predetermined fee, which is normally referred as viewing on a pay-per-view basis, but also includes viewing via a subscription basis.

Unfortunately, when broadcasting premium content to client systems (e.g., Pay-Per-View, HBO, Showtime, etc.), the broadcast systems must ensure that premium content is not captured or pirated by client set-top boxes. As such, the broadcast systems traditionally transmit content in an encrypted format, which is streamed to the client set-top boxes. As a result, the client set-top boxes must include content decryption capability in order to enable playback of the content to users. In addition, current set-top boxes also include the capability to capture premium content, which is stored and may be viewed by a user at a later time using content playback capability of the set-top box. Accordingly, in such a set-top box environment, it is vital to prevent exposure of clear content on the set-top box, which may be pirated by a user.

Consequently, current decrypt solutions in the field labor at complying with industry standards robustness rules for avoiding exposure of clear content on a set-top box. Fortunately, avoiding exposure of clear content on a set-top is facilitated when a set-top box runs a proprietary operating system and a non-standard software architecture. Unfortunately, as we move into more advanced set-top box environments, operating systems utilized by the set-top boxes are becoming standardized. In addition, software environments and architectures running on these advanced set-top boxes are also becoming standardized. Consequently, this openness, or open system, facilitates development of features on set-top boxes, however, presents various challenges from a security standpoint.

Therefore, there remains a need to overcome one or more of the limitations in the above-described, existing art.

BRIEF DESCRIPTION OF THE DRAWINGS

The present invention is illustrated by way of example, and not by way of limitation, in the figures of the accompanying drawings and in which.

DETAILED DESCRIPTION

Figure 1:
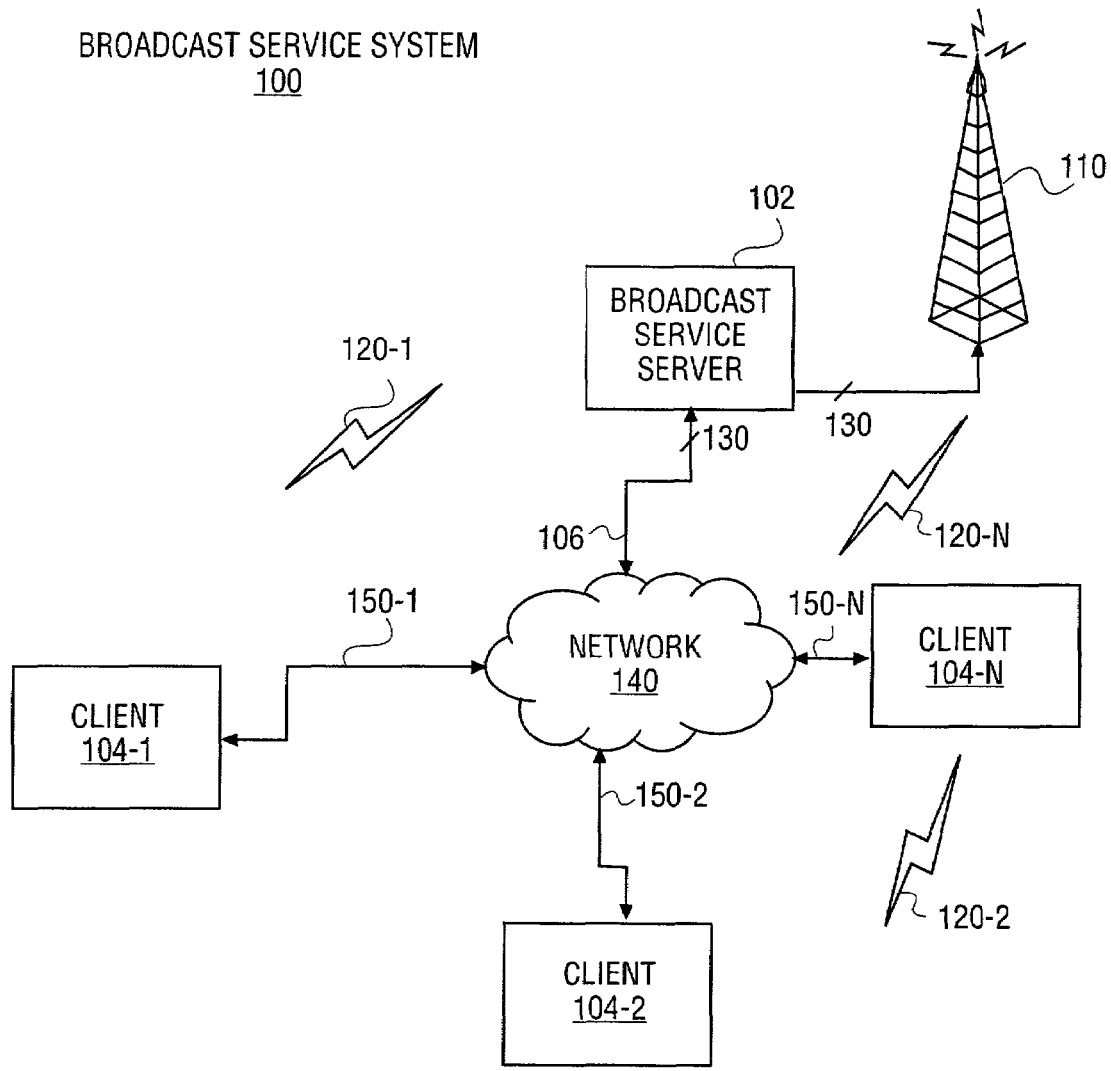
FIG. 1 depicts a block diagram illustrating a broadcast service system as known in the art.

The present invention describes an apparatus and method for enabling secure content decryption within a set-top box. The method includes performance of security authentication of a content driver by a content decryption component. Security authentication is performed in order to verify an identity of the content driver as a secure content driver. Next, the content decryption component receives an encrypted content stream from the secure content driver. Once received, the content decryption component performs integrity authentication of a run-time image of the secure content driver. Finally, while integrity authentication of the secure content driver is verified, the content decryption component streams decrypted content to the secure content driver to enable playback of the decrypted content to a user.

The method also includes establishment of security authentication from a content decryption component to verify a content driver as the secure content driver. Once verified, the secure content driver receives access to a callback function in order to receive clear, decrypted content streams from the content decryption component. Next, the secure content driver receives a stream of encrypted content.

The content driver then streams the encrypted content to the content decryption component. Finally, assuming the secure content driver is successfully authenticated, the secure content driver receives clear, decrypted content from the content decryption component via the received callback function.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (compact disc, read-only memory), and magneto-optical disks, ROMs (read-only memory), RAMs (random access memory), EPROMs (erasable programmable read-only memory), EEPROMs (electrically erasable programmable read-only memory), magnet or optical cards, flash memory, or other type of media/machine-readable medium suitable for storing electronic instructions. Moreover, the present invention may also be downloaded as a computer program product. As such, the program may be transferred from a remote computer (e.g., a server) to a requesting computer (e.g., a client) by way of data signals embodied in a carrier wave or other propagation medium via a communication link (e.g., a modem or network connection).

System Architecture

FIG. 1 is an illustration of one embodiment of a conventional broadcast service system 100, as known to those skilled in the art. The broadcast service system 100 includes a server 102 configured to broadcast encrypted content 130 to a plurality of clients 104 (104-1, . . . , 104-N) via antenna 110. The clients 105 receive a broadcast of the encrypted content from server 102 through a plurality of links 120 (120-1, 120-2, . . . , 120-N) from a broadcast antenna 110. Unfortunately, links 120 are uni-directional wireless radio frequency (RF) links from broadcast antenna 110.

In one embodiment, the broadcast service system 100 broadcasts the encrypted content 130 via the network 140 which provides a capability for enabling users of the client systems 104 to provide feedback to broadcasters with regard to programming. The format of such broadcasts is, for example but not limited to, known amplitude modification (AM) or frequency modification (FM) radio signals, television (TV) signals, digital video broadcasts (DVB) signals, advanced television systems committee (ATSC) signals, or the like, which are broadcast through the atmosphere. In addition, transmission of encrypted content via the network 140 is accomplished by conventional means, such as, for example, transmission control protocol (TCP)/Internet protocol (TCP/IP).

Accordingly, the broadcast server may transmit encrypted content via broadcast antenna 110 or via the network 140 using, for example, TCP/IP. The encrypted content 130 may include, for example, any combination of a number of different types of content including for example video, audio, graphics, text, multi-media or the like. For purposes of explanation, many of the examples provided in this disclosure assume that the content to be transmitted by the server 102 are audio/video files, such as for example movies with moving images and sound.

However, it will be appreciated that the content transmitted in accordance with the teachings of the present invention is not limited only to audio/video files. As described above, content, as contemplated by the present invention includes any combination of, for example, video, audio, graphics, text, multi-media or the like. In one embodiment, network 140 may be any type of communications network through which a plurality of different devices may communicate such as, but not limited to, the Internet, a wide area network (WAN), a local area network (LAN), an Intranet, an Extranet or the like.

Figure 2:
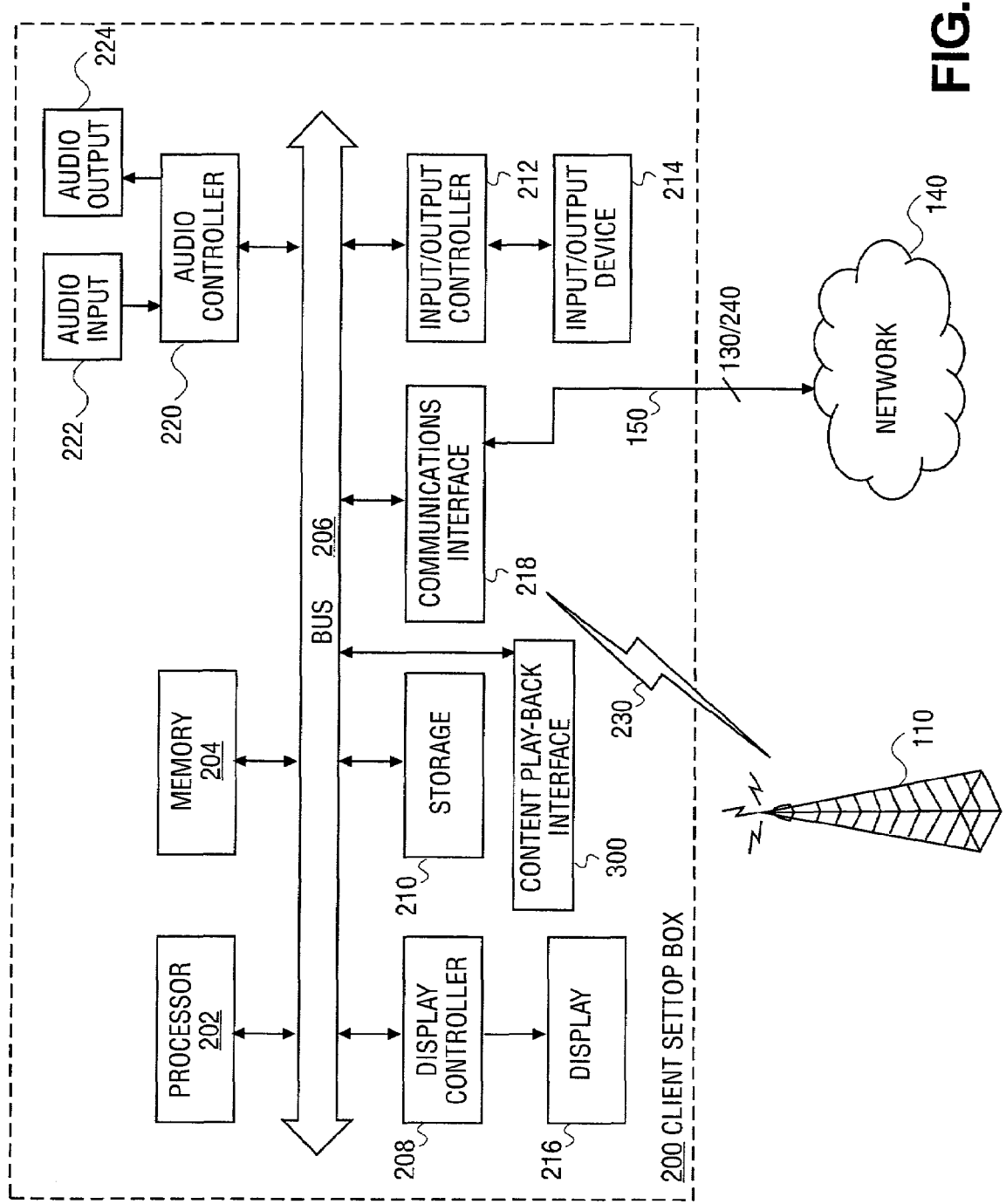
FIG. 2 depicts a block diagram illustrating a computer system representative of a client within the broadcast service system as depicted in FIG. 1 in accordance with an embodiment of the present invention.

FIG. 2 is a block diagram illustrating one embodiment of a machine 200 that may be used for the clients 104 in accordance with the teachings of the present invention. The machine 200 is, for example, a computer or a set top box that includes a processor 202 coupled to a bus 206. The machine 200 includes a memory 204, a storage 210, a display controller 208, a communications interface 218, a content playback interface 300, an input/output controller 212 and an audio controller 220 are also coupled to bus 206.

In one embodiment, machine 200 interfaces to external systems through communications interface 218. Communications interface 218 may include, for example, a radio transceiver compatible with AM, FM, TV, digital TV, DVB, ATSC, wireless telephone signals or the like. Communications interface 218 may also include, for example, an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices.

A carrier wave signal 230 including, for example, encrypted content 130 may be received by communications interface 218 from antenna 110. In addition, a signal 240 may be received/transmitted between communications interface and network 140 including, for example, the encrypted content 130 as well as content meta-data, user response and data, or the like. The signal 240 may also be used to interface machine 200 with another computer system, a network hub, router or the like. The carrier wave signal 230 is, for example, considered to be machine readable media, which may be transmitted through wires, cables, optical fibers or through the atmosphere, or the like.

The processor 202 may be a conventional microprocessor, such as, for example, but not limited to an Intel x86 or Pentium family microprocessor, a Motorola family microprocessor, or the like. Memory 204 may be a machine readable medium such as dynamic random access memory (DRAM) and may include static random access memory (SRAM). Display controller 208 controls, in a conventional manner, a display 216, which may be a cathode ray tube (CRT), a liquid crystal display (LCD), an active matrix display, a television monitor or the like.

The input/output device 214 coupled to input/output controller 212 may be, for example, a keyboard, disk drive, printer, scanner and other input and output devices, including a television remote, mouse, trackball, trackpad, joystick, or the like. In one embodiment, audio controller 222 controls in a conventional manner audio output 224, which may include for example audio speakers, headphones, an audio receiver, amplifier or the like. In addition, the audio controller may also control, in a conventional manner, audio input 229, which may include for example a microphone or input(s) from an audio or musical device, or the like.

The storage 210 may, for example, include machine readable media such as for example but not limited to a magnetic hard disk, a floppy disk, an optical disk, a smart card or another form of storage for data. Alternatively, the storage 210 may include, for example, removable media, read-only media, readable/writable media or the like. Some of the data may, for example, be written by a direct memory access process into memory 204 during execution of software in computer system 201. It is appreciated that software may reside in storage 210, memory 204 or may be transmitted or received via modem or the communications interface.

For the purposes of the specification, the term "machine readable medium" shall be taken to include any medium that is capable of storing data, information or encoding a sequence of instructions for execution by processor 202 to cause processor 202 to perform the methodologies of the present invention. The term "machine readable medium" shall be taken to include, but is not limited to solid-state memories, optical and magnetic disks, carrier wave signals, and the like.

The machine 200 further includes a content playback interface 300, which receives the encrypted content stream 130 from the communications interface 218 via the bus 206. The content playback interface 300 is further illustrated with reference to FIG. 3. The content playback interface 300 includes a playback user interface (UI) 302 which enables a user to provide a request for playback of received content that is contained within an application user space 316. The playback interface 300 includes a content transfer at block 304 that interfaces with the communications interface 218 in order to receive the encrypted content stream 130. Once received, the encrypted content stream may be stored in a content storage device 306. Alternatively, the encrypted content is stored within the storage 210 or the memory 204.

Accordingly, when the playback user interface 302 receives a request for playback of content, a content source file reader 308 selects the requested content from the content storage device 306. The selected encrypted content 130 is provided to a content reader interface 310. Once received, the content reader interface 310 provides the encrypted content stream 130 to a secure content driver 320. Once provided, the content reader interface 310 directs the secure content driver 320, via filter switch 312, to stream the encrypted content to a content decryption component 330 in order to decrypt the received content.

However, in order for the secure content driver 320 to receive decrypted content from the content decryption component 330, the secure content driver 320 must achieve successful security authentication at start-up from the content decryption component 330, which are located within a kernel application space 318. Accordingly, the content decryption component 330 resides in a secure, tamper-resistant software (TRS) environment in order to obfuscate the process of decrypting encrypted content streams 130 received from the secure content driver 320. As such, during start-up of the content playback interface 300, the secure content driver 320 registers with the content decryption component 330 in order to receive security identity authentication.

In one embodiment, identity authentication is provided using the public key infrastructure. As known to those skilled in the art, the public key infrastructure (PKI) enables users of unsecure public networks, such as the Internet, to securely and privately exchange data and money through the use of a public and a private cryptographic key pair that is obtained and shared through a trusted authority. The public key infrastructure provides for a digital certificate that can identify an individual or an organization and directory of services that can store, and when necessary, revoke the certificates.

As such, the content decryption component 330 may, in one embodiment, authenticate the identity of the secure content driver 320 utilizing a digital certificate issued to the secure content driver 320. In addition, the content decryption component 330 must also authenticate integrity of a static image of the secure content driver 320. This is, for example, accomplished using, in one embodiment, a digital signature of a static image of the secure content driver 320 prior to loading the secure content driver within memory 204. Accordingly, using a digital signature of a static image of the secure content driver 320, the content decryption component 330 may compute a hash value of a static image of the secure content driver. Once computed, the content decryption component 330 verifies that the computed hash value matches a static hash value contained within the digital signature of the secure content driver 320.

In a further embodiment, the content decryption component 330 also provides for run-time integrity authentication of the secure content driver 320 utilizing a pre-stored run-time digital signature of the secure content driver 320. In this embodiment, the content decryption component 330 generates a hash value of code segments that perform the functionality of the secure content driver 320 while loaded in memory. Next, the computed hash value is compared with a run-time hash value contained within the run-time digital signature. Consequently, the various security constraints utilized by the content decryption component 330 enable security verification of the content driver 320.

Accordingly, once security authentication is completed, the secure content driver 320 receives clear, decrypted content via a callback function 332 provided to the secure content driver 320. However, the various security constraints taught by the present invention do not cause current playback solutions to be modified in any way. Due to the fact that there is a given content player (content source reader file reader 308 and content media interface 310), no changes need to be made to the application user space 316 of current set-top boxes. As a result, the present invention requires modification of the kernel application space 318 for registering a secure content driver 320 with a tamper-resistant content decryption component 330.

Figure 3:
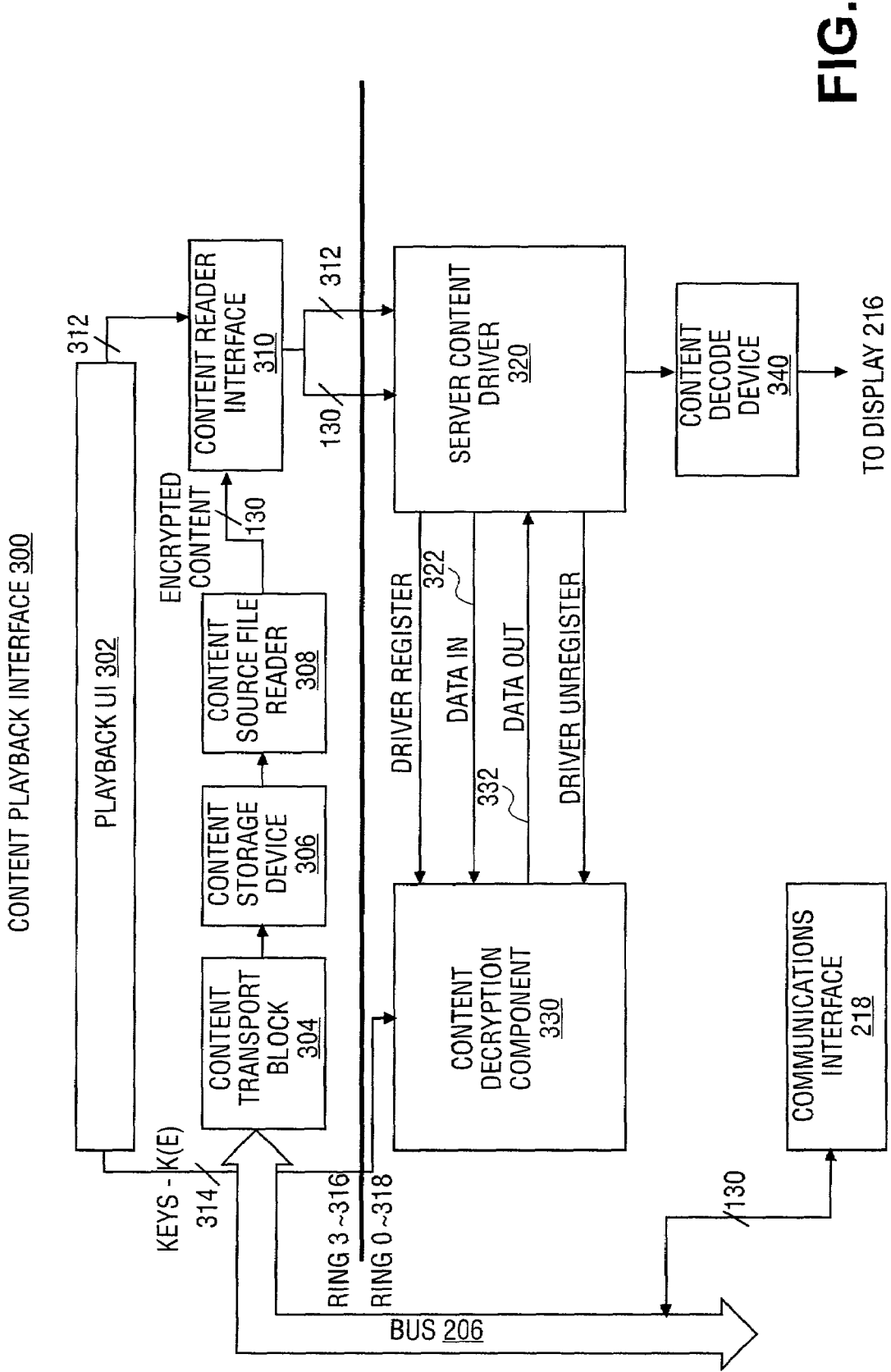
FIG. 3 depicts a block diagram illustrating a content playback interface of the client computer as depicted in FIG. 2 in accordance with a further embodiment of the present invention.
Figure 4:
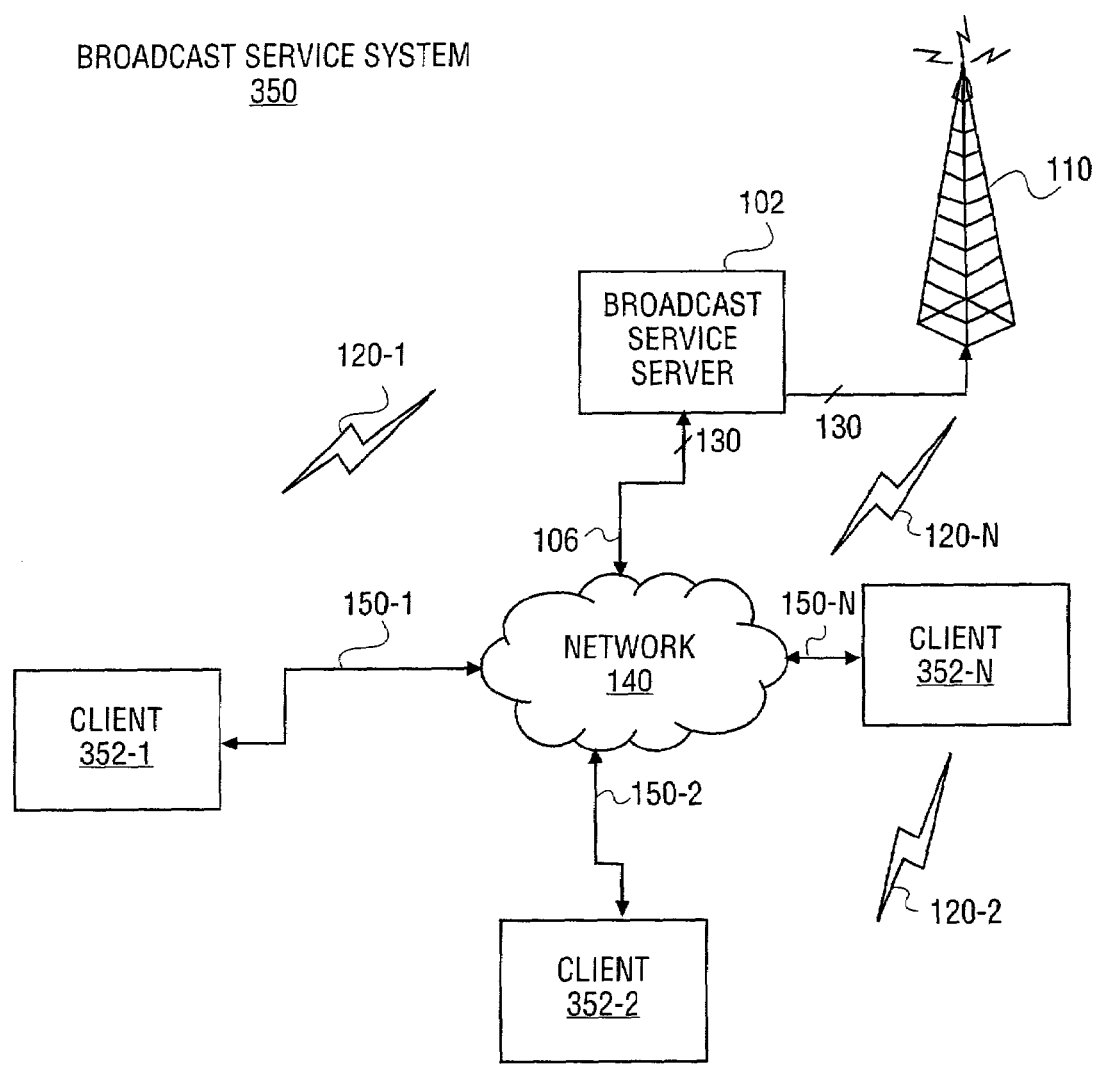
FIG. 4 depicts a block diagram illustrating a broadcast service system utilizing client computers configured as depicted in FIGS. 3 and 4 in accordance with an exemplary embodiment of the present invention.

Referring now to FIG. 4, FIG. 4 depicts a broadcast service system 350 utilizing clients 352 (352-1, 352-2, ..., 352-N), each configured as, for example, a set-top box as depicted in FIG. 2 utilizing a content playback interface 300 as depicted in FIG. 3. Accordingly, a server of the broadcast system 350 may broadcast or transmit encrypted content via broadcast antenna 110 or network 140 to the various clients 352. As such, the various clients will receive the encrypted content 130 via communications interface 218.

Consequently, when a user desires playback of received content, the content playback interface 300 will decrypt the received encrypted content 130 using a content decryption component 330 and a secure content driver 320. As a result, utilizing the teachings of the present invention, a broadcast service system 350 prevents unauthorized use or display of clear content, which may be pirated by users of the set-top box. Procedural methods for implementing the teachings of the present invention are now described.

Operation

Figure 5:
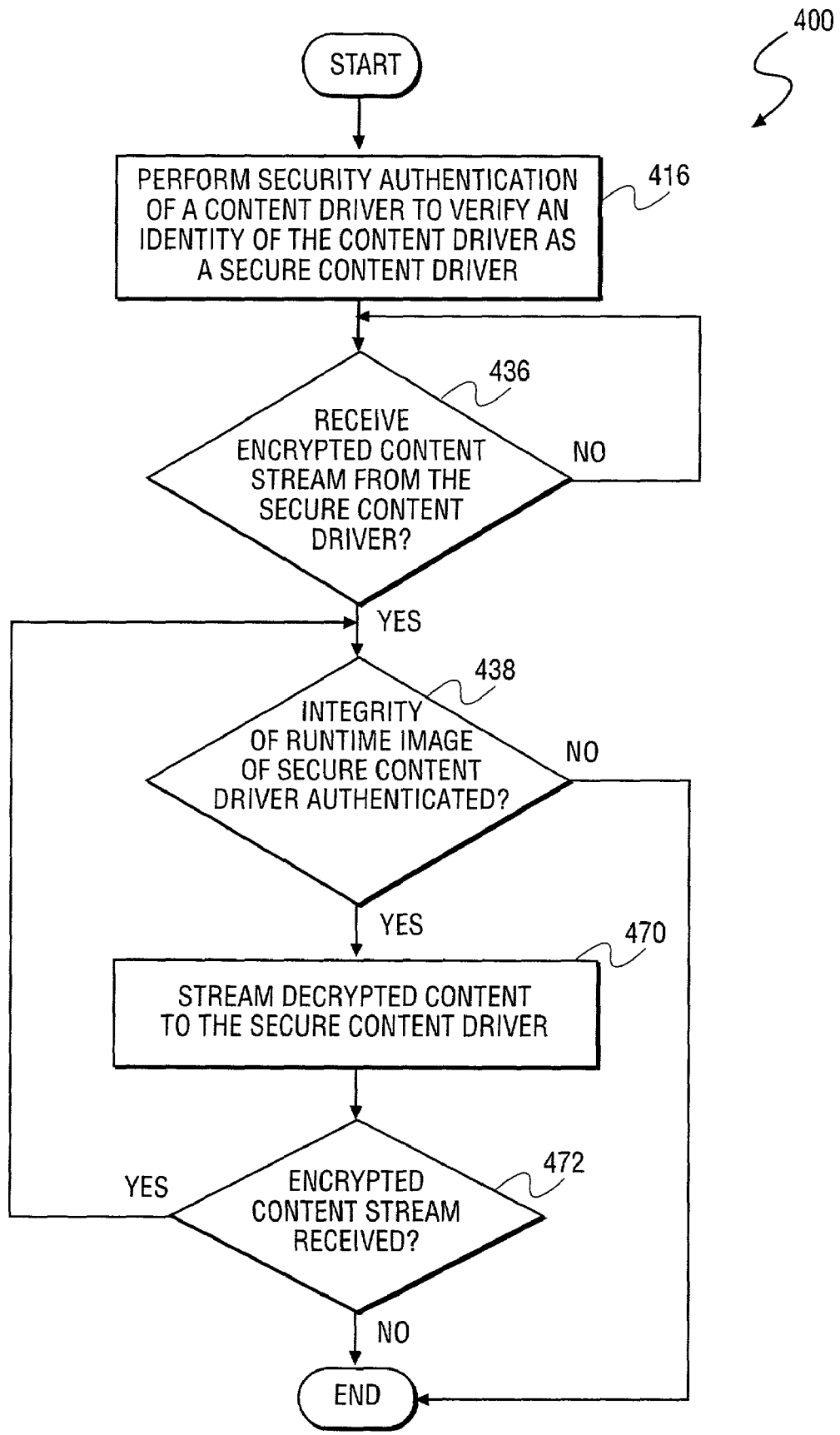
FIG. 5 depicts a flowchart illustrating a method for enabling secure content decryption within a set-top box in accordance with an embodiment of the present invention.

Referring now to FIG. 5, FIG. 5 depicts a flowchart illustrating a method 400 for enabling secure, dynamic content decryption on a set-top box, for example, within the broadcast service system 350 as depicted in FIG. 4. At process block 416, a content decryption component 330 performs security authentication of a content driver to verify authenticity of the content driver as a secure content driver 320. Next, at process block 436, the content decryption component 330 receives a stream of encrypted content 130 from the secure content driver 320. Once received, process block 438 is performed. At process block 438, the content decryption component 330 performs integrity authentication of a run-time image of the secure content driver 320.

Consequently, once integrity of the run-time image of the secure content driver 320 is authenticated, process block 470 is performed. Otherwise, the method 400 terminates. At process block 470, the content decryption component 330 streams decrypted content to the secure content driver 320. Finally, at process block 472, it is determined whether encrypted content continues to be received by the content decryption component 330. Accordingly, process blocks 438-470 are repeated while encrypted content is streamed to the content decryption component 330. Once encrypted content is not longer received, the process terminates.

Figure 6:
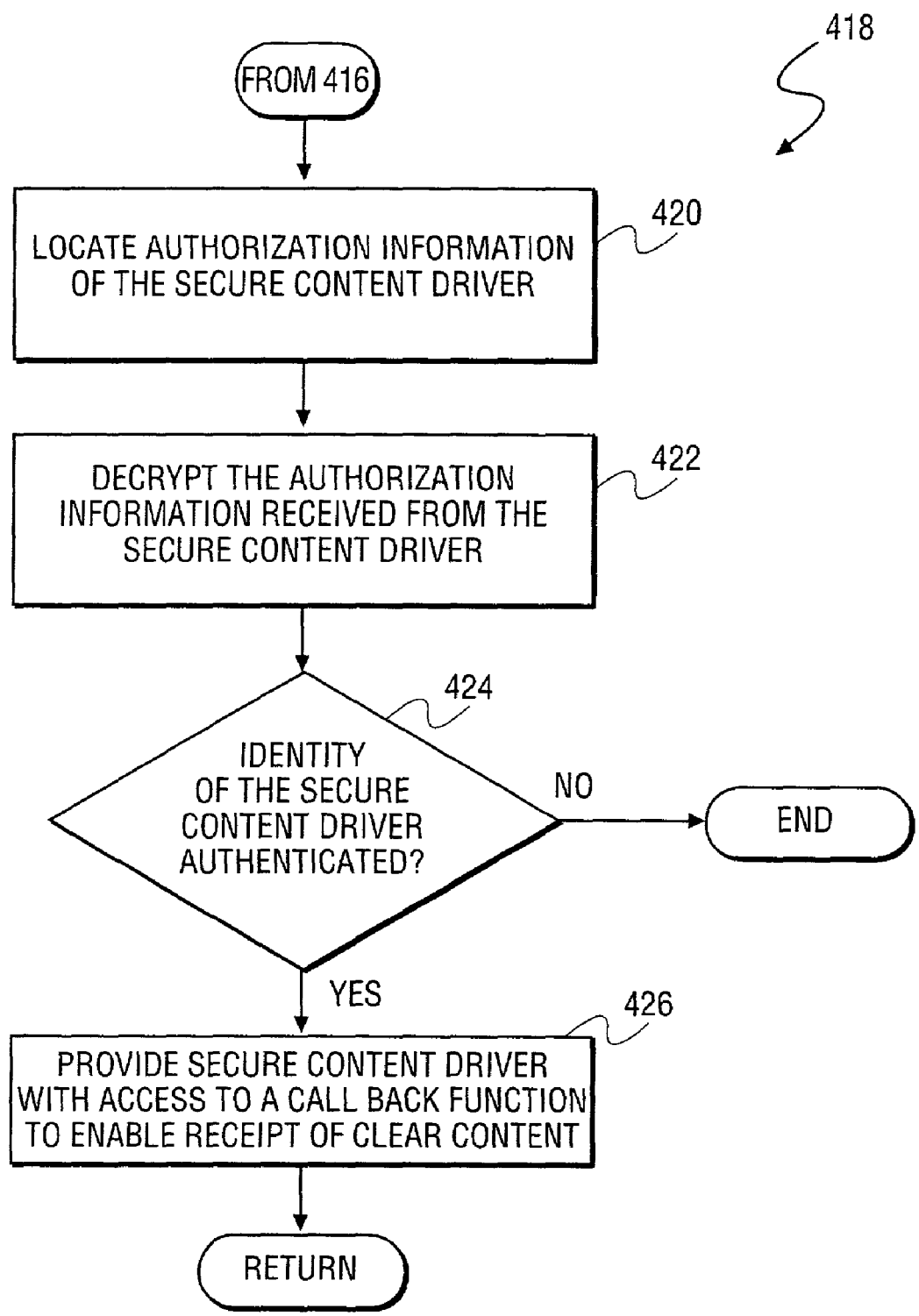
FIG. 6 depicts a flowchart illustrating an additional method for performing security authentication in accordance with a further embodiment of the present invention.

Referring now to FIG. 6, FIG. 6 depicts a flowchart illustrating an additional method 418 for performing security authentication of process block 416 as depicted in FIG. 5. At process block 420, the content decryption component 330 locates authorization information of the secure content driver 320. In one embodiment, the authorization information is a digital certificate issued to the secure content driver 320. At process block 422, the content decryption component 330 decrypts the authorization information received from the secure content driver 320.

In the embodiment described, a digital certificate received as the authorization information is decrypted using a public key of the secure content driver 320. Once decrypted, process block 424 is performed. At process block 420, it is determined whether an identity of the secure content driver 320 is authenticated based on the decrypted authorization information. When the content decryption component 330 fails to authenticate an identity of the secure content driver 320, the method terminates. Otherwise, process block 426 is performed.

At process block 426, the content decryption component 330 provides the secure content driver 320 with access to a callback function 332. As such, once the secure content driver 320 has access to the callback function 332, the secure content driver may receive clear, decrypted content from the content decryption component 330 via the callback function. Otherwise, regardless of whether the secure content driver 320 streams encrypted content to the content decryption component 330, unless the secure content driver 320 has access to the callback function 332, the secure content driver 320 cannot receive the clear content. Once access to the callback function is received, control flow returns to process block 416, as depicted in FIG. 5.

Figure 7:
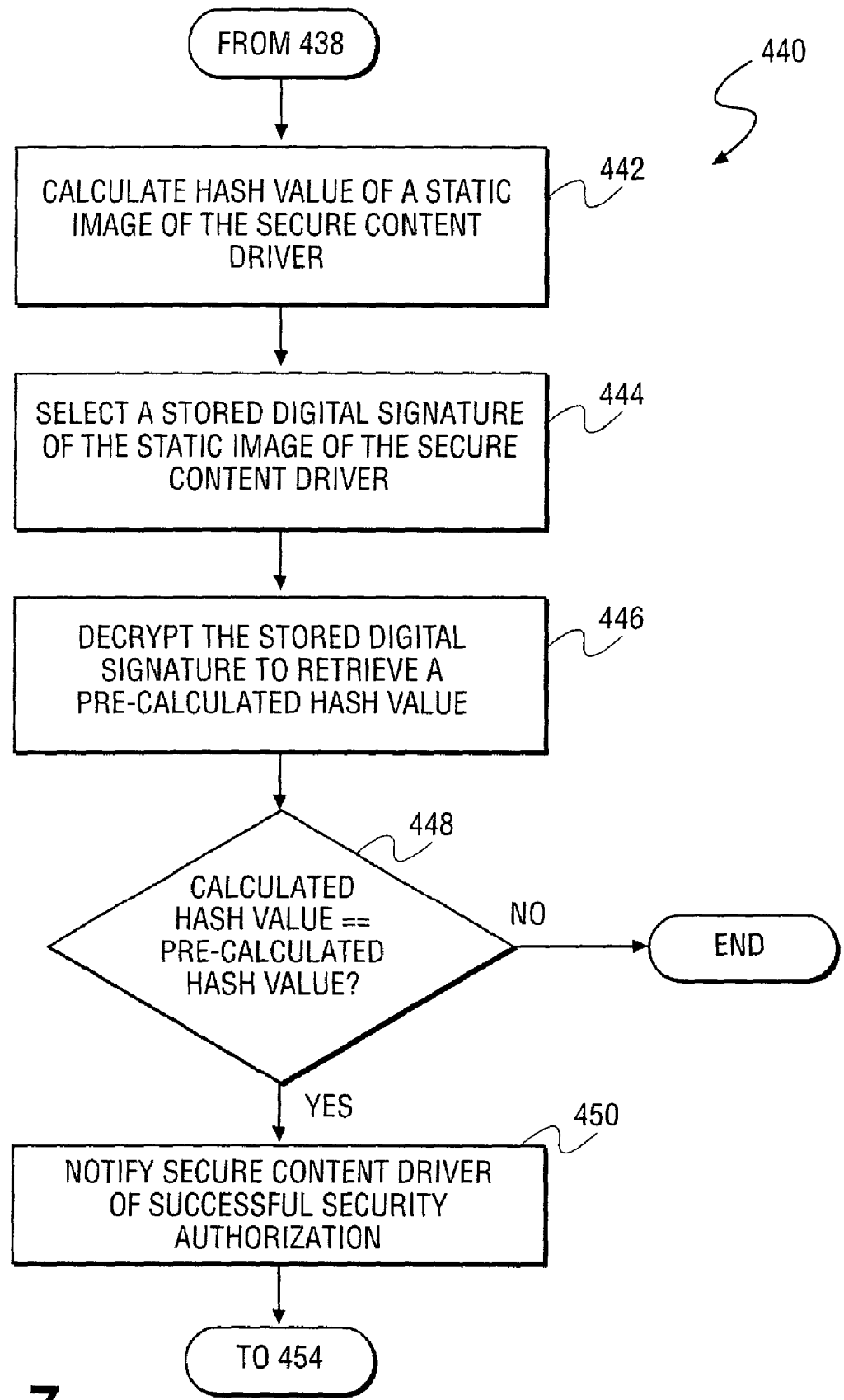
FIG. 7 depicts a flowchart illustrating an additional method for performing run-time integrity verification in accordance with a further embodiment of the present invention.

Referring now to FIG. 7, FIG. 7 depicts an additional method 440 for performing run-time integrity authentication of process block 438, as depicted in FIG. 5. At process block 442, the content decryption component 330 calculates a hash value of a static image of the secure content driver 320. As described herein, the term "static image" refers to program instructions that perform the functionality of the secure content driver prior to loading of the program instructions within memory or at run-time. In one embodiment, hash values utilized by the present invention are calculated using the Rivas-Shamir-Adelman (RSA) authentication system. Once calculated, process block 444 is performed.

At process block 444, the content decryption component 330 selects a stored digital signature of the static image of the secure content driver 330. Next, at process block 446, the content decryption component 330 decrypts the stored digital signature of the static image to retrieve a pre-calculated hash value of the static image. Next, at process block 448, it is determined whether the calculated hash value matches the pre-calculated hash value. When the hash values match, process block 450 is performed. Otherwise, the process terminates. At process block 450, the content decryption component notifies the secure content driver 330 of successful security authentication. Next, control flow progresses to process block 454 of the method 452, as depicted in FIG. 9.

Figure 8:
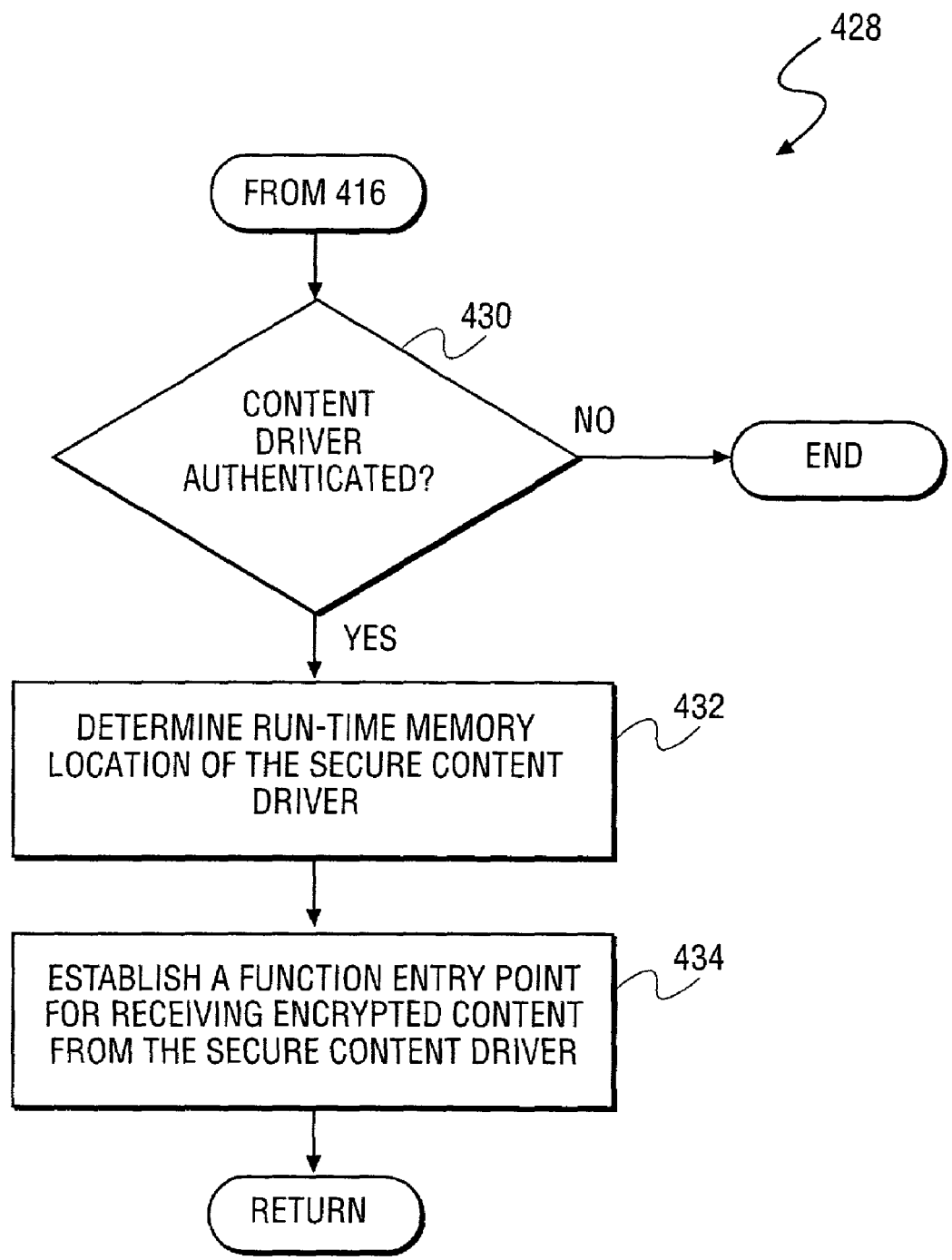
FIG. 8 depicts a flowchart illustrating an additional method for performing security authentication in accordance with a further embodiment of the present invention.

Referring now to FIG. 8, FIG. 8 depicts a flowchart illustrating an additional method 428 for performing security authentication of process block 416, as depicted in FIG. 5. At process block 430, it is determined whether an identity of the secure content driver 320 is authenticated. Once authenticated, process block 432 is performed. Otherwise, the method terminates. At process block 432, the content decryption component 330 determines a run-time memory location wherein the content driver 320 is loaded once executed by the content playback interface 300. Finally, at process block 434, the content decryption component establishes a function entry point 322 from the secure content driver 320 in order to receive the stream of encrypted content from the secure content driver 320. Once established, control flow returns to process block 416, as depicted in FIG. 5.

Figure 9:
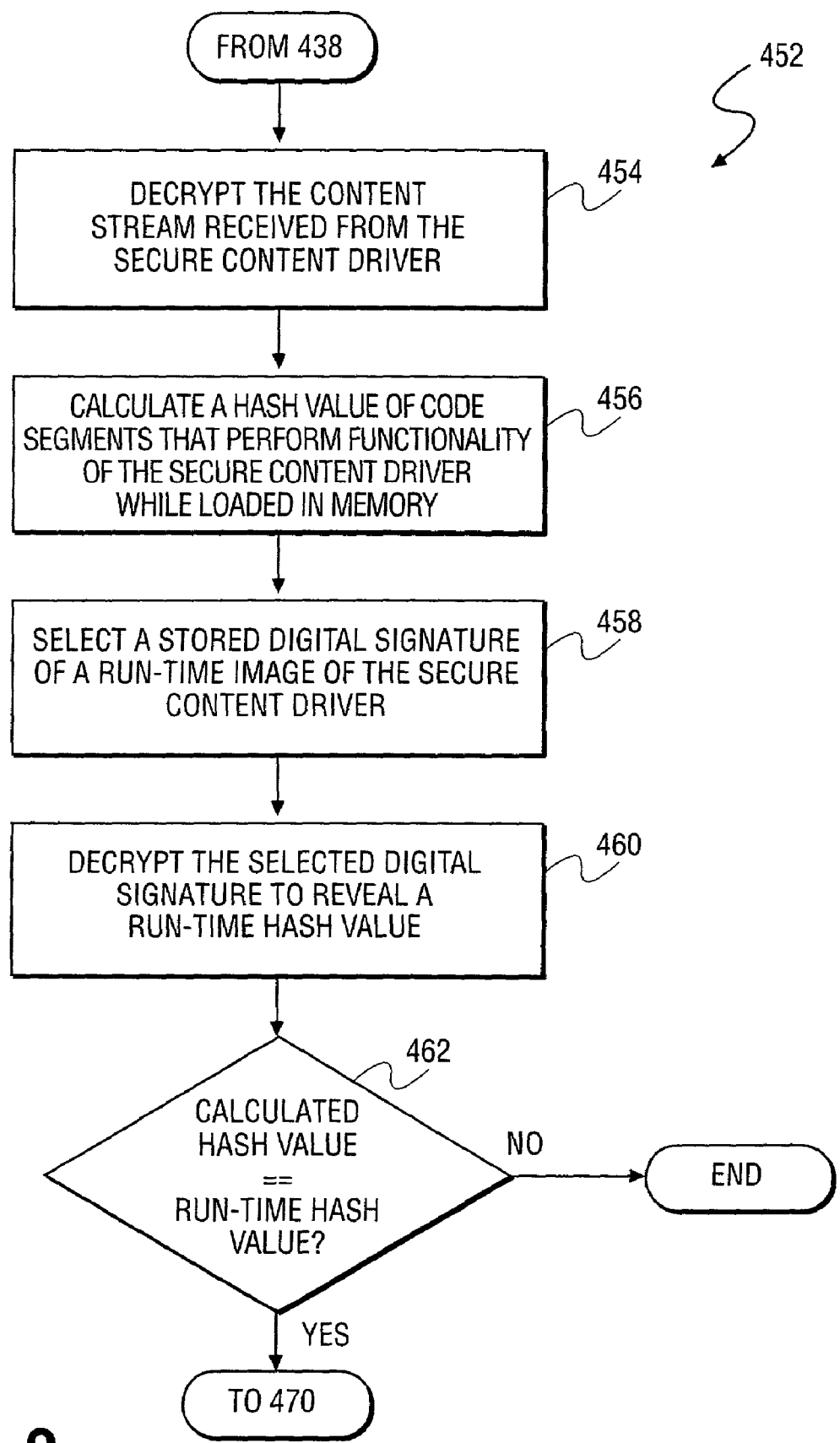
FIG. 9 depicts a flowchart illustrating an additional method for performing run-time integrity verification in accordance with a further embodiment of the present invention.

Referring now to FIG. 9, FIG. 9 depicts a flowchart illustrating an additional method 452 for performing run-time integrity authentication of process block 438, as depicted in FIG. 5. At process block 454, the content decryption component 330 decrypts the encrypted content stream 130 received from the secure content driver 320. Next, at process block 456, the content decryption component calculates a hash value of code segments that perform functionality of the secure content driver 320 while loaded in memory. Once calculated, process block 458 is performed. At process block 458, the content decryption component selects a stored run-time digital signature of a run-time image of the secure content driver.

As described herein, the term "run-time image" refers to program instructions that perform the functionality of the secure content driver 320 when loaded in memory. As such, the run-time image consists of the program instructions loaded in memory to perform the functionality of the secure content driver 320. Once selected, process block 460 is performed. At process block 460, the content decryption component 330 decrypts the selected digital signature to reveal a run-time hash value of a run-time image of the secure content driver 320. Finally, at process block 462, it is determined whether the calculated hash value matches the run-time hash value. When the hash values match, control flows to process block 470, as depicted in FIG. 5. Otherwise, the method terminates.

Figure 10:
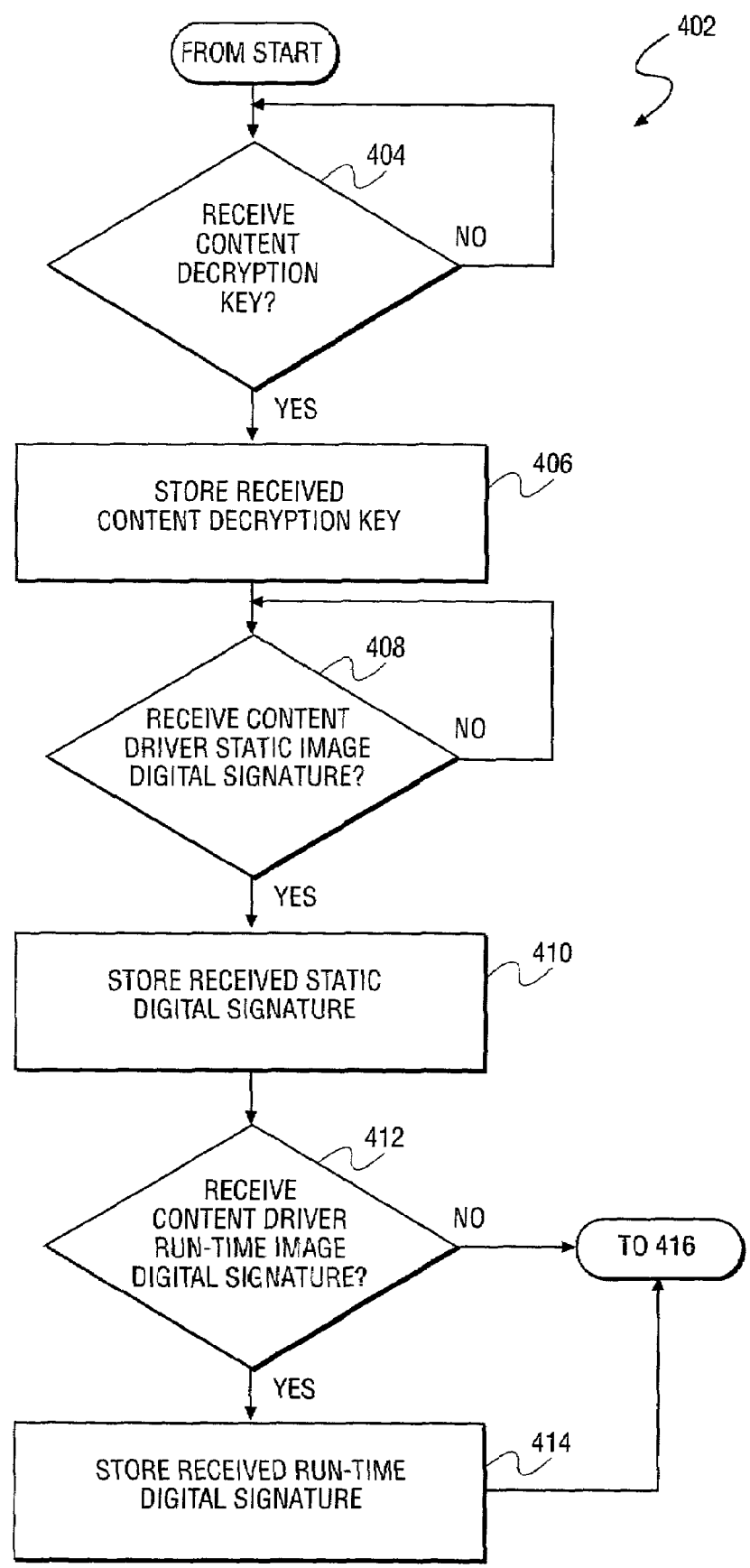
FIG. 10 depicts a flowchart illustrating a method for initialization of a content decryption component in accordance with an exemplary embodiment of the present invention.

Referring now to FIG. 10, FIG. 10 depicts a flowchart illustrating a method 402 for initialization of the content decryption component 330 in accordance with an exemplary embodiment of the present invention. At process block 404, it is determined whether the content decryption component 330 has received a content decryption key 314. The content decryption key 314 enables the content decryption component to decrypt received encrypted content streams. In the embodiment described, only the content decryption component has access to the content decryption key which is receive using, for example, the PKI. Once received, process block 406 is performed. At process block 406, the content decryption component stores the received content decryption key within the tamper-resistant software environment of the content decryption component 330. Once stored, process block 408 is performed.

At process block 408, it is determined whether the content decryption component 330 has received a digital signature of a static image of the secure content driver 320. Once received, the static digital signature of the secure content driver 320 is stored within the tamper-resistant software environment of the content decryption component 330 at process block 410. At process block 412, it is determined whether the content decryption component 330 has received a run-time digital signature of a run-time image of the secure content driver 320. Once received, process block 414 is performed. At process block 414, the received run-time digital signature is stored within the tamper-resistant software environment of the content decryption component 330. Once stored, control flow branches to process block 416 as depicted in FIG. 5.

Figure 11:
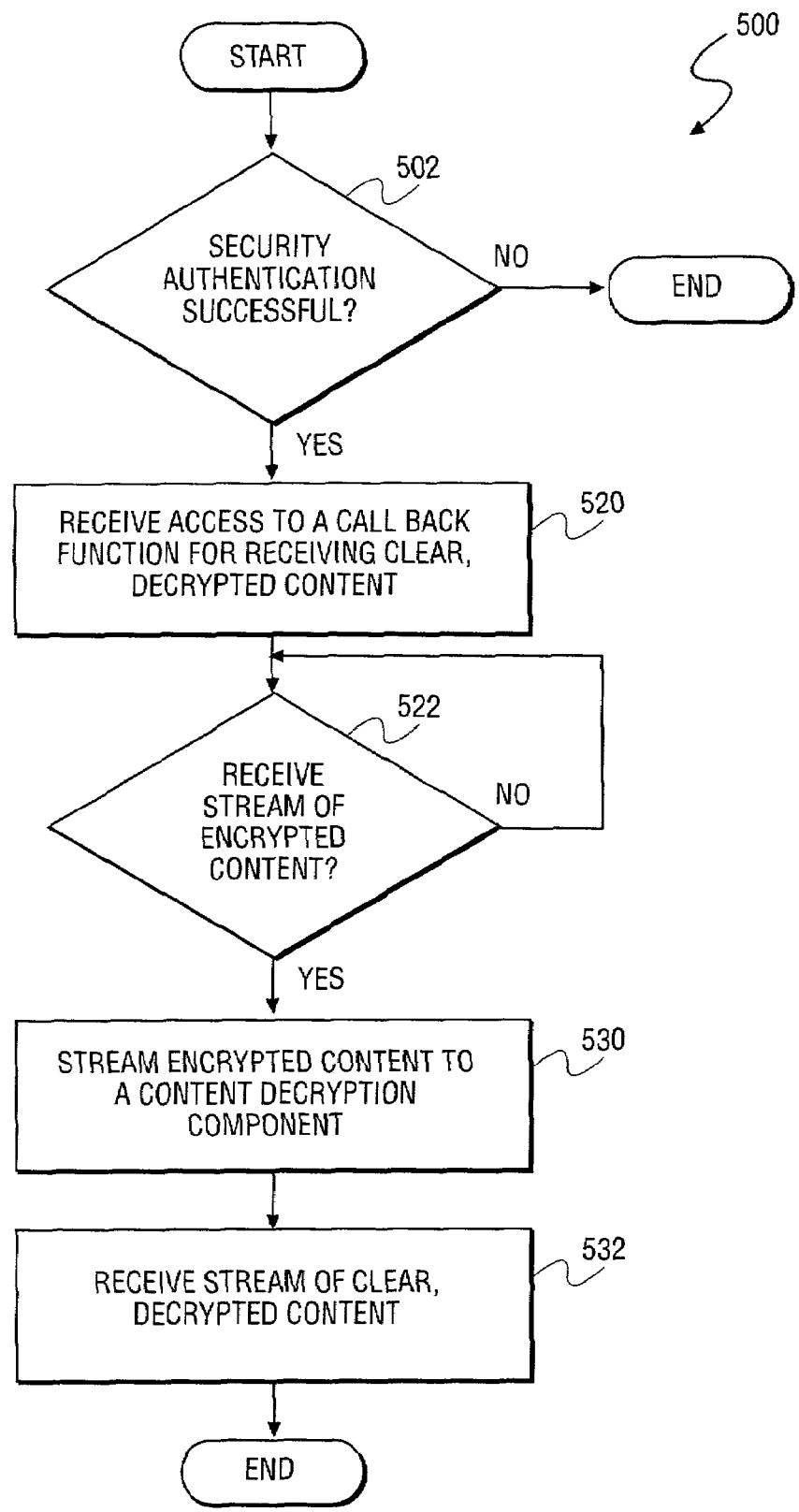
FIG. 11 depicts a method for authenticating a secure content drive in order to receive clear, decrypted content in accordance with an embodiment of the present invention.

Referring now to FIG. 11, FIG. 11 depicts a flowchart illustrating a method 500 for establishment of security authentication by a secure content driver 320 in order to receive clear, decrypted content from the content decryption component 330. At process block 502, it is determined whether the secure content driver 320 has received security authentication from the content decryption component 330. If security authentication is not received, the process terminates. Once successful security authentication is received, process block 520 is performed. At process block 520, the secure content driver 320 receives access to a callback function 332.

As described above, access to the callback function enables the secure content driver 320 to receive clear, decrypted content from the content decryption component 332. Otherwise, clear content is not received, resulting in failure to playback content to a requesting user. Once received, process block 522 is performed. At process block 522, it is determined whether the secure content driver 320 has received a stream of encrypted content. Once received, process block 530 is performed. At process block 530, the content driver 320 streams the received encrypted content to the content decryption component 330. Finally, at process block 532, the secure content driver 320 will receive a stream of clear, decrypted content from the content decryption component 330.

Figure 12:
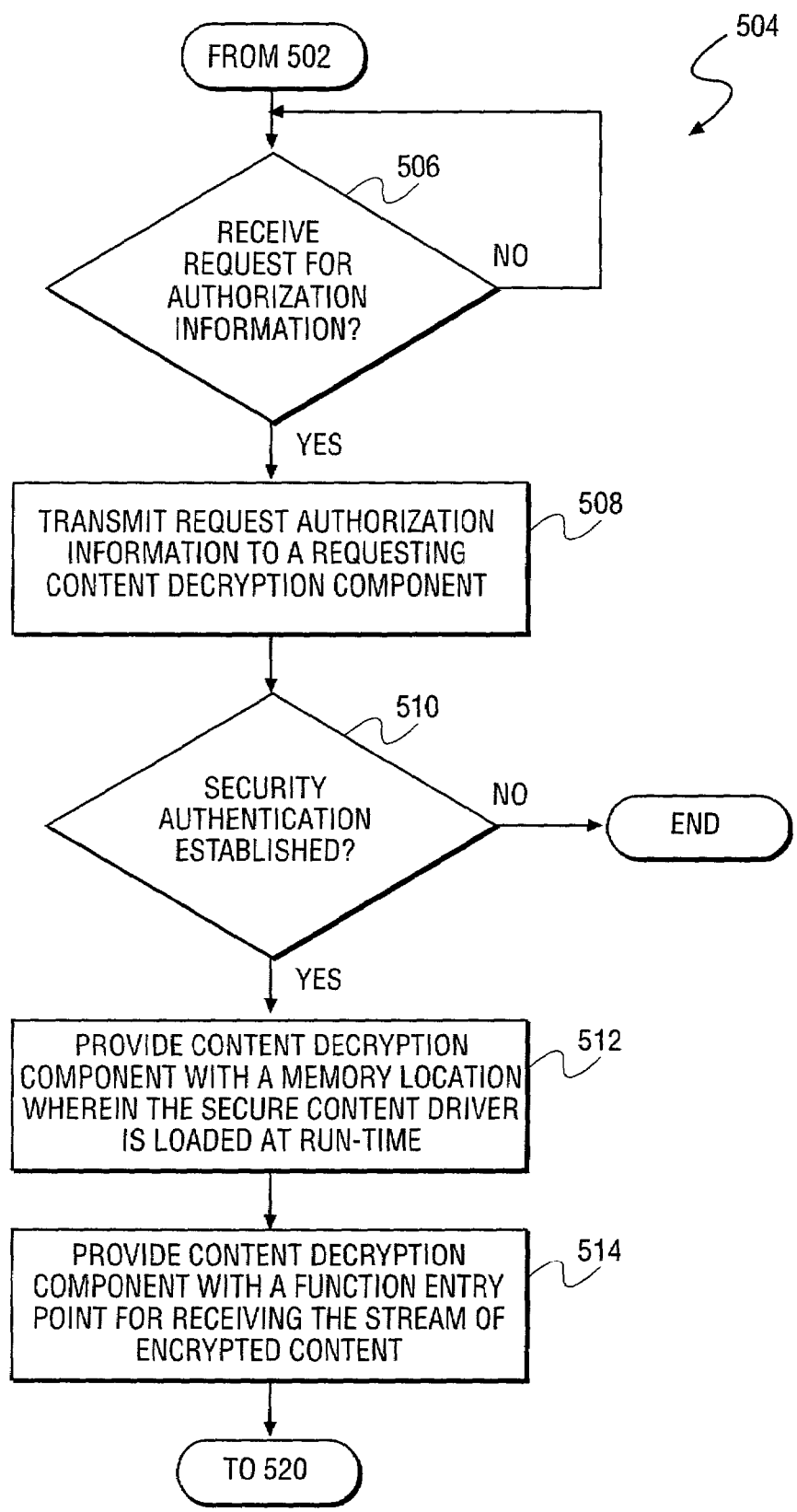
FIG. 12 depicts a flowchart illustrating an additional method for performing security authentication in accordance with a further embodiment of the present invention.

Referring now to FIG. 12, FIG. 12 depicts a flowchart illustrating an additional method for achieving successful security authentication from the content decryption component 330. At process block 506, the secure content driver 320 may receive a request for authorization information from the content decryption component 330. As described above, the authorization information is, in one embodiment, a digital certificate issued to the secure content driver 320. Once a request is received, process block 508 is performed. At process block 508, the secure content driver 320 transmits the requested authorization information to the requesting content decryption component 330.

Next, at process block 510, it is determined whether security authentication is successfully established. When security authentication is established, process block 512 is performed. Otherwise, the process terminates. At process block 512, the secure content driver 320 provides the content decryption component 330 with a memory location wherein the secure content driver 320 program instructions are loaded at run-time. Finally, at process block 514, the secure content driver 320 provides the content decryption component 330 with a function entry point 322 for receiving the stream of encrypted content. Once provided, control flow branches to process block 520, as depicted in FIG. 11.

Figure 13:
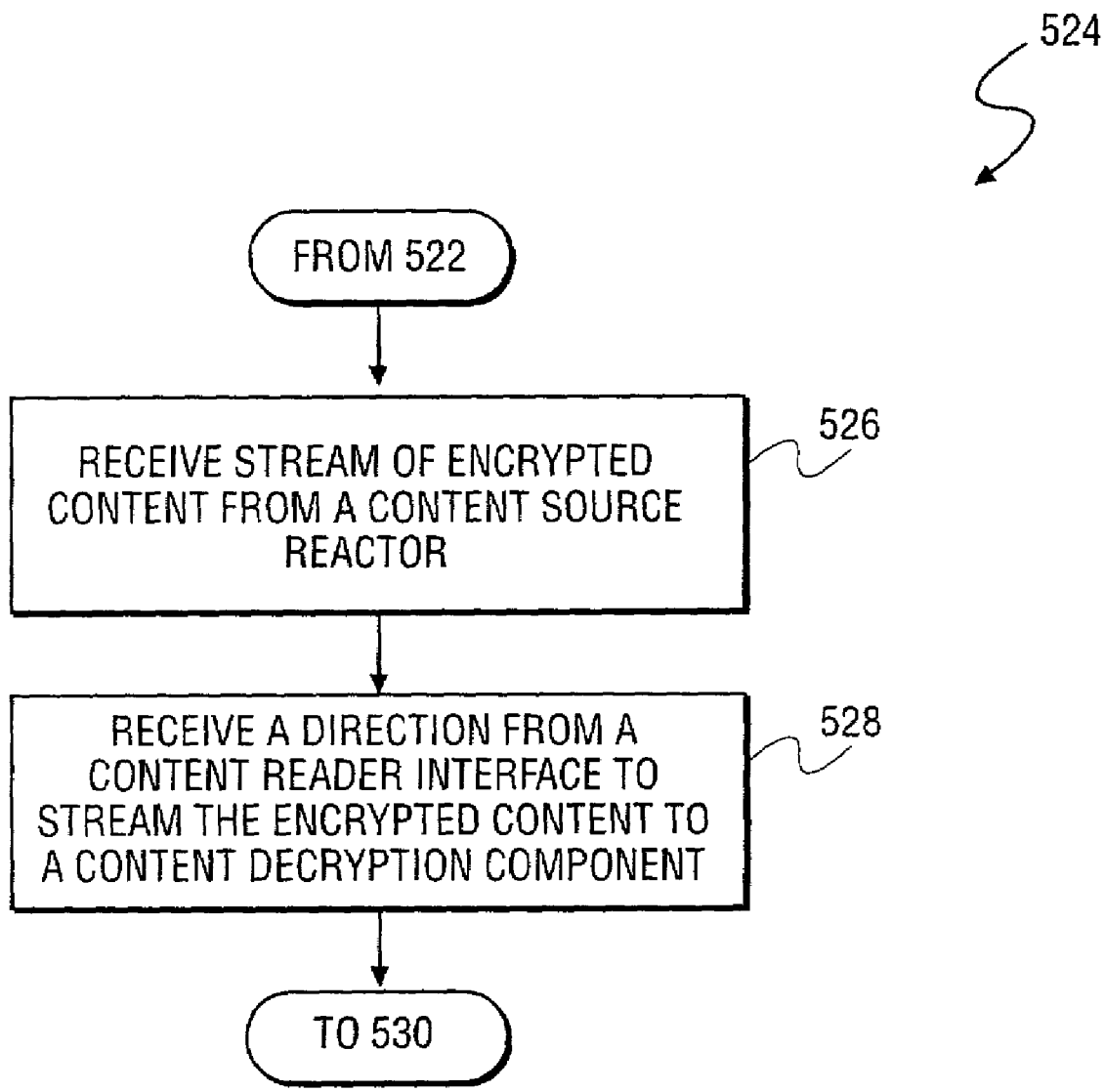
FIG. 13 depicts a flowchart illustrating an additional method for the receipt of a stream of encrypted content in accordance with an exemplary embodiment of the present invention.

Finally, referring to FIG. 13, FIG. 13 depicts a flow chart illustrating an additional method 524 performed once a stream of encrypted content is received at process block 522, as depicted in FIG. 11. At process block 526, the secure content driver 320 receives a stream of encrypted content from a content source reader 310. Next, at process block 528, a content reader interface 310 directs the secure content driver 320, via filter switch 312, to stream the received encrypted content to the content decryption component 330. Once streamed, control flow branches to process block 530, as depicted in FIG. 11.

Accordingly, utilizing the teachings of the present invention, the content decryption component 320 ensures that a content driver is authenticated as a secure content driver 330 utilizing the various security authentication mechanisms as described herein. Once authenticated as a secure content driver 320, both from an identity standpoint and a run-time integrity standpoint, the secure content driver 320 will stream encrypted content to the content decryption component 330, which is decrypted by the content decryption component 330 and then streamed back to the secure content driver 320 via the callback function 322. As a result, the secure content driver 320 may then provide the received, clear decrypted content to a content decode device 340. In one embodiment, the content decode device 340 is a motion picture expert group 2 (MPEG-2) hardware decode chip. Once decoded, the content may be transmitted to display 216 in order to enable playback to the user.

ALTERNATE EMBODIMENTS

Several aspects of one implementation of a set-top box for providing secure, automated content decryption have been described. However, various implementations of the set-top box provide numerous features including, complementing, supplementing, and/or replacing the features described above. Features can be implemented as part of the set-top box or as part of a computer, digital video receiver, cable receiver, or the like in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a set-top box, it will be appreciated by those skilled in the art that the teaching of the present invention can be applied to other systems. In fact, systems for receipt of content streamed in a media streaming format are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to avoid exposure of clear content on a set-top box, which utilizes an open environment including a standardized operating system, as well as standardized software environments and architectures. Moreover, the solution does not cause current playback solutions to be modified in any way. Due to the fact that there is a given content player, no changes need to be made to an application user space of current set-top boxes. As a result, the present invention only requires modification of a kernel application space for registering a secure content driver with a tamper-resistant content decryption component. Accordingly, application development time and time to market for a set-top box utilizing the teachings of the present invention are minimized.

Having disclosed exemplary embodiments and the best mode, modifications and variations may be made to the disclosed embodiments while remaining within the scope of the invention as defined by the following claims.

What is claimed is:

1. A method comprising:
    performing security authentication of a content driver by a content decryption component in order to verify an identity of the content driver as a secure content driver, wherein the content driver and the content decryption component are located within a kernel application space, wherein the kernel application space is modified for registering the secure content driver with the content decryption component in order for the secure content driver to receive security identity authentication, wherein the content decryption component is tamper-resistant;
    receiving an encrypted content stream from the secure content driver;
    performing integrity authentication of a run-time image of the secure content driver; and
    while integrity authentication of the secure content driver is verified, streaming decrypted content to the secure content driver to enable playback of the decrypted content to a user,
    wherein performing integrity authentication further comprises:
        decrypting the encrypted content stream received from the secure content driver;
        while decrypting the received encrypted content stream, performing a hash value calculation of code segments that perform functionality of the secure content driver while loaded in memory;
        selecting a stored digital signature of the run-time image of the secure content driver;
    decrypting the digital signature to reveal a run-time hash value;
        comparing the computed hash value with the run-time hash value of the secure content driver; and
        while the calculated hash value matches the run-time hash value of the secure content driver, repeating the decryption, the performing, the selecting and the comparing until decryption of the received encrypted content stream is complete.

2. The method of claim 1, wherein performing security authentication further comprises:
    locating authorization information of the secure content driver;
    decrypting the authorization information received from the secure content driver; and
    authenticating an identity of the secure content driver based on the decrypted authorization information.

3. The method of claim 2, wherein authenticating the identity further comprises:
    calculating a hash value of a static image of the secure content driver prior to loading the secure content driver into memory;
    selecting a stored digital signature of the static image;
    decrypting the stored digital signature to retrieve a pre-calculated hash value of the secure content driver;
    comparing the pre-calculated hash value with the calculated hash value; and
    when the calculated hash value matches the pre-calculated hash value of the secure content driver, notifying the secure content driver of successful security authentication.

4. The method of claim 1, wherein performing security authentication further comprises:
    once security authentication of the content driver is established, determining a run-time at memory location of the secure content driver; and
    establishing a function entry point for receiving the stream of encrypted content from the secure content driver.

5. The method of claim 1, further comprising:
    receiving a content decryption key in order to enable decryption of encrypted content streams received from the secure content driver;
    receiving a digital signature of a static image of the secure content driver; and
    receiving a digital signature of a run-time image of the secure content driver.

6. A method comprising:
    establishing security authentication from a content decryption component, such that a content driver is verified as a secure content driver, wherein the content driver and the content decryption component are located within a kernel application space, wherein the kernel application space is modified for registering the secure content driver with the content decryption component in order for the secure content driver to receive security identity authentication, and wherein the content decryption component is tamper-resistant;
when establishment of security authentication is successful, receiving access to a callback function in order to receive clear, decrypted content streams from the content decryption component;
receiving a stream of encrypted content;
while establishing integrity authentication of a run-time image of the secure content driver, streaming the encrypted content to the content decryption component; and
when security authentication is successfully established, receiving clear, decrypted content from the content decryption component via the received callback function,
wherein establishing integrity authentication further comprises:
 decrypting the encrypted content stream received from the secure content driver;
 while decrypting the received encrypted content stream, performing a hash value calculation of code segments that perform functionality of the secure content driver while loaded in memory;
 selecting a stored digital signature of the run-time image of the secure content driver;
decrypting the digital signature to reveal a run-time hash value;
 comparing the computed hash value with the run-time hash value of the secure content driver; and
 while the calculated hash value matches the run-time hash value of the secure content driver, repeating the decryption, the performing, the selecting and the comparing until decryption of the received encrypted content stream is complete.

7. The method of claim 6, wherein establishing security verification further comprises:
 receiving a request for authorization information from the content decryption component;
 transmitting the requested authorization information to the content decryption component; and
 when security authentication is successfully established, receiving notification of successful security authentication from the content decryption component, such that, the content driver is established as the secure content driver.

8. The method of claim 6, wherein establishing security authentication further comprises:
 once security authentication is established, providing content decryption component with a memory location wherein the secure content driver is loaded at run-time; and
 providing the content decryption component with a function entry point for receiving the stream of encrypted content.

9. The method of claim 6, wherein receiving encrypted content further comprises:
 receiving encrypted content from a content source reader; and
 receiving a direction from a content driver to stream the encrypted content to the content decryption component.

10. A computer readable storage medium including program instruction that directs a computer to function in a specified manner when executed by a processor, the program instructions comprising:
 performing security authentication of a content driver by a content decryption component in order to verify an identity of the content driver as a secure content driver, wherein the content driver and the content decryption component are located within a kernel application space, wherein the kernel application space is modified for registering the secure content driver with the content decryption component in order for the secure content driver to receive security identity authentication, and wherein the content decryption component is tamper-resistant;
receiving an encrypted content stream from the secure content driver;
performing integrity authentication of a run-time image of the secure content driver; and
while integrity authentication of the secure content driver is verified, streaming decrypted content to the secure content driver to enable playback of the decrypted content to a user,
wherein performing integrity authentication further comprises:
 decrypting the encrypted content stream received from the secure content driver;
 while decrypting the received encrypted content stream, performing a hash value calculation of code segments that perform functionality of the secure content driver while loaded in memory;
 selecting a stored digital signature of the run-time image of the secure content driver;
 decrypting the digital signature to reveal a run-time hash value;
 comparing the computed hash value with the run-time hash value of the secure content driver; and
 while the calculated hash value matches the run-time hash value of the secure content driver, repeating the decryption, the performing, the selecting and the comparing until decryption of the received encrypted content stream is complete.

11. The computer readable storage medium of claim 10, wherein performing security authentication further comprises:
 locating authorization information of the secure content driver;
 decrypting the authorization information received from the secure content driver; and
 authenticating an identity of the secure content driver based on the decrypted authorization information.

12. The computer readable storage medium of claim 11, wherein authenticating the identity further comprises:
 calculating a hash value of a static image of the secure content driver prior to loading the secure content driver into memory;
 selecting a stored digital signature of the static image;
 decrypting the stored digital signature to retrieve a pre-calculated hash value of the secure content driver;
 comparing the pre-calculated hash value with the calculated hash value; and
 when the calculated hash value matches the pre-calculated hash value of the secure content driver, notifying the secure content driver of successful security authentication.

13. The computer readable storage medium of claim 10, wherein performing security authentication further comprises:
 once security authentication of the content driver is established, determining a run-time at memory location of the secure content driver; and
 establishing a function entry point for receiving the stream of encrypted content from the secure content driver.

14. The computer readable storage medium of claim 10, further comprising:
   receiving a content decryption key in order to enable decryption of encrypted content streams received from the secure content driver;
   receiving a digital signature of a static image of the secure content driver; and
   receiving a digital signature of a run-time image of the secure content driver.

15. A computer readable storage medium including program instruction that directs a computer to function in a specified manner when executed by a processor, the program instructions comprising:
   establishing security authentication from a content decryption component, such that a content driver is verified as a secure content driver, wherein the content driver and the content decryption component are located within a kernel application space, wherein the kernel application space is modified for registering the secure content driver with the content decryption component in order for the secure content driver to receive security identity authentication, and wherein the content decryption component is tamper-resistant;
   when establishment of security authentication is successful, receiving access to a callback function in order to receive clear, decrypted content streams from the content decryption component;
   receiving a stream of encrypted content;
   while establishing integrity authentication of a run-time image of the secure content driver, streaming the encrypted content to the content decryption component; and
   when security authentication is successfully established, receiving clear, decrypted content from the content decryption component via the received callback function,
   wherein establishing integrity authentication further comprises:
      decrypting the encrypted content stream received from the secure content driver;
      while decrypting the received encrypted content stream performing a hash value calculation of code segments that perform functionality of the secure content driver while loaded in memory;
      selecting a stored digital signature of the run-time image of the secure content driver;
      decrypting the digital signature to reveal a run-time hash value;
      comparing the computed hash value with the run-time hash value of the secure content driver; and
      while the calculated hash value matches the run-time hash value of the secure content driver, repeating the decryption, the performing, the selecting and the comparing until decryption of the received encrypted content stream is complete.

16. The computer readable storage medium of claim 15, wherein
   establishing security verification further comprises:
   receiving a request for authorization information from the content decryption component;
   transmitting the requested authorization information to the content decryption component; and
   when security authentication is successfully established, receiving notification of successful security authentication from the content decryption component, such that the content driver is established as the secure content driver.

17. The computer readable storage medium of claim 15, wherein establishing security authentication further comprises:
   once security authentication is established, providing content decryption component with a memory location wherein the secure content driver is loaded at run-time; and
   providing the content decryption component with a function entry point for receiving the stream of encrypted content.

18. The computer readable storage medium of claim 15, wherein receiving encrypted content further comprises:
   receiving encrypted content from a content source reader; and
   receiving a direction from a content driver to stream the encrypted content to the content decryption component.

19. An apparatus, comprising:
   a processor having circuitry to execute instructions;
   a content play-back interface coupled to the processor, the content play-back interface to receive encrypted content, and to enable play-back of the received encrypted content to a user; and
   a storage device coupled to the processor, having sequences of instructions stored therein, which when executed by the processor cause the processor to:
      perform security authentication of a content driver by a content decryption component in order to verify an identity of the content driver as a secure content driver, wherein the content driver and the content decryption component are located within a kernel application space, wherein the kernel application space is modified for registering the secure content driver with the content decryption component in order for the secure content driver to receive security identity authentication, and wherein the content decryption component is tamper-resistant,
      receive an encrypted content stream from the secure content driver,
      perform integrity authentication of a run-time image of the secure content driver, and
      while integrity authentication of the secure content driver is verified, stream decrypted content to the secure content driver to enable playback of the decrypted content to a user,
      wherein the instruction to perform integrity authentication further comprises the processor to:
         decrypt the encrypted content stream received from the secure content driver,
         while decrypting the received encrypted content stream, perform a hash value calculation of code segments that perform functionality of the secure content driver while loaded in memory,
         select a stored digital signature of the run-time image of the secure content driver,
         decrypt the digital signature to reveal a run-time hash value,
         compare the computed hash value with the run-time hash value of the secure content driver, and
         while the calculated hash value matches the run-time hash value of the secure content driver, repeat the decryption, the performing, the selecting and the comparing until decryption of the received encrypted content stream is complete.

20. The apparatus of claim 19, wherein the instruction to perform security authentication further comprises the processor to:
- locate authorization information of the secure content driver,
- decrypt the authorization information received from the secure content driver, and
- authenticate an identity of the secure content driver based on the decrypted authorization information.

21. The apparatus of claim 20, wherein the instruction to perform security authentication further comprises the processor to:
- calculate a hash value of a static image of the secure content driver prior to loading the secure content driver into memory,
- select a stored digital signature of the static image,
- decrypt the digital signature to retrieve a pre-calculated hash value of the secure content driver,
- compare the pre-calculated hash value with the calculated hash value, and
- when the calculated hash value matches the pre-calculated hash value of the secure content driver, notify the secure content driver of successful security authentication.

22. The apparatus of claim 19, wherein the instruction to perform security authentication further comprises the processor to:
- once security authentication of the content driver is established, determine a run-time at memory location of the secure content driver, and
- establish a function entry point for receiving the stream of encrypted content from the secure content driver.

23. The apparatus of claim 19, wherein the processor is further caused to:
- receive a content decryption key in order to enable decryption of encrypted content streams received from the secure content driver,
- receive a digital signature of a static image of the secure content driver, and
- receive a digital signature of a run-time image of the secure content driver.

24. The apparatus of claim 19, wherein the processor is further caused to:
- establish security authentication from a content decryption component, such that a content driver is verified as a secure content driver,
- when establishment of security authentication is successful, receive access to a callback function in order to receive clear, decrypted content streams from the content decryption component,
- receive a stream of encrypted content,
- stream the encrypted content to the content decryption component, and
- when security authentication is successfully established, receive clear, decrypted content from the content decryption component via the received callback function.

25. The apparatus of claim 19, wherein the instruction to establish security verification further comprises the processor to:
- receive a request for authorization information from the content decryption component,
- transmit the requested authorization information to the content decryption component, and
- when security authentication is successfully established, receive notification of successful security authentication from the content decryption component, such that the content driver is established as the secure content driver.

26. The apparatus of claim 19, wherein the instruction to establish security authentication further comprises the processor to:
- once security authentication is established,
- provide content decryption component with a memory location wherein the secure content driver is loaded at run-time, and
- provide the content decryption component with a function entry point for receiving the stream of encrypted content.

27. The apparatus of claim 19, wherein the instruction to receive encrypted content further comprises the processor to:
- receive encrypted content from a content source reader, and
- receive a direction from a content driver to stream the encrypted content to the content decryption component.

* * * * *